(12) United States Patent
Juhlin

(10) Patent No.: US 9,667,043 B2
(45) Date of Patent: May 30, 2017

(54) DEVICE FOR HIGH FREQUENCY CURRENT DAMPING

(71) Applicant: ABB Schweiz AG, Baden (CH)

(72) Inventor: Lars-Erik Juhlin, Ludvika (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/124,963

(22) PCT Filed: Mar. 10, 2014

(86) PCT No.: PCT/EP2014/054570
§ 371 (c)(1),
(2) Date: Sep. 9, 2016

(87) PCT Pub. No.: WO2015/135564
PCT Pub. Date: Sep. 17, 2015

(65) Prior Publication Data
US 2017/0077686 A1    Mar. 16, 2017

(51) Int. Cl.
*H02G 3/02* (2006.01)
*H01B 5/06* (2006.01)
*H01B 5/02* (2006.01)
*H01B 1/02* (2006.01)
*H01B 1/06* (2006.01)
*H02G 5/00* (2006.01)
*H02B 13/065* (2006.01)

(52) U.S. Cl.
CPC .............. *H02G 3/02* (2013.01); *H01B 1/023* (2013.01); *H01B 1/026* (2013.01); *H01B 1/06* (2013.01); *H01B 5/02* (2013.01); *H01B 5/06* (2013.01); *H02G 5/00* (2013.01); *H02B 13/065* (2013.01)

(58) Field of Classification Search
CPC . H02G 3/02; H02G 5/00; H01B 1/023; H01B 1/026; H01B 1/06; H01B 1/02
See application file for complete search history.

(56) References Cited

U.S. PATENT DOCUMENTS

| | | | |
|---|---|---|---|
| 1,307,995 A | 6/1919 | Armor | |
| 3,829,707 A * | 8/1974 | Pflanz | H02G 5/063 174/126.2 |

(Continued)

FOREIGN PATENT DOCUMENTS

EP    2 390 891 A1    11/2011

*Primary Examiner* — Timothy Thompson
*Assistant Examiner* — Amol Patel
(74) *Attorney, Agent, or Firm* — Birch, Stewart, Kolasch & Birch, LLP

(57) ABSTRACT

A device for damping of high frequency currents is provided. The device includes a conductor extending along a main axis, a first damping path including a first damping element extending along a first axis and a second damping path including a second damping element extending along a second axis. The first and second damping elements are arranged on opposite sides of the conductor. The main axis, the first axis and the second axis are different and separate from each other. The first damping element and the second damping element are spaced apart from the conductor and electrically connected in parallel with the conductor between a first position and a second position along the conductor. Further, from the first position to the second position, a resistance of the conductor is lower than a resistance of either one of the first and second damping paths.

20 Claims, 4 Drawing Sheets

(56) References Cited

U.S. PATENT DOCUMENTS 3,911,567 A * 10/1975 Hofer .................. H01B 5/02
                                                    174/99 E
2013/0063855 A1* 3/2013 Smugala .............. H01F 17/062
                                                    361/111

* cited by examiner

DEVICE FOR HIGH FREQUENCY CURRENT DAMPING

FIELD OF THE INVENTION

The present invention relates generally to the field of high frequency damping or attenuation. In particular, the present invention relates to a device comprising elements for damping or attenuation of high frequency electric currents.

BACKGROUND OF THE INVENTION

In an electrical power installation or substation, especially for high voltage applications, a bus bar is a strip, bar or conductor that connects equipments within the installation or substation, such as for example circuit breakers, measuring devices, a capacitor bank or other electrical apparatus. In for example a substation containing power electronic equipments for high power, as in an HVDC (High Voltage Direct Current) station, high frequency noise might occur in the bus bars of the substation or part thereof. High frequency damping technology relates to damping or attenuation of such undesired high frequency noise, i.e. damping or attenuation of high frequency alternating currents.

High frequency damping technology may rely on the skin effect which is the tendency for an electric current to flow mainly at the outer surface of a conductor, such as a bus bar, within a thickness called the skin depth. The skin effect causes the effective resistance of the conductor to increase at higher frequencies where the skin depth is smaller. For high frequency damping, the skin effect may be used to reroute and, thereby attenuate, high frequency currents.

SUMMARY OF THE INVENTION

According to a general aspect, there is provided a device comprising a conductor extending along a main axis, a first damping path including a first damping element and a second damping path including a second damping element. The first damping element extends along a first axis and the second damping element extends along a second axis. The first and second damping elements are arranged on opposite sides of the conductor. The main axis, the first axis and the second axis are different and separate from each other. The first damping element and the second damping element are spaced apart from the conductor and electrically connected in parallel with the conductor between a first position and a second position along the conductor. Further, from the first position to the second position, a resistance of the conductor is lower than a resistance of either one of the first and second damping paths.

The device is advantageous in that two electrical damping paths for damping high frequency currents are provided. A first damping path is provided by a connection of the first damping element to the conductor and a second damping path is provided by a connection of the second damping element to the conductor (or conducting element). The damping of the high frequency currents relies on the skin effect wherein high frequency currents flow at the outer surface of the conductor and are then rerouted at the first position (or first point or first node) along the conductor to the first damping element and to the second damping element. The attenuation of the high frequency currents is provided by the higher resistance obtained in each of these two electrical damping paths as compared to the resistance of the conductor between the first point and the second point.

The device is particularly advantageous in that the first and second damping elements are spaced apart from the conductor. In other words, an air gap is provided between the conductor and the damping elements. The magnetic field in this air gap forces the high frequency currents to flow in the first and second damping elements, thereby increasing the attenuation of the high frequency currents in the conductor. The effect of the magnetic field increases with the distance between the conductor and the first and second damping elements.

The device is also advantageous in that it provides an increased degree of freedom in design, and in particular a number of physical parameters for adjusting the damping characteristic (or attenuation gain) of the device, since it is based on an arrangement of two separate damping elements in proximity to the conductor but still spaced apart from the conductor. For example, the attenuation gain may be controlled by adjusting the distance from the conductor to each one of the first and second damping elements, the diameter or size of the conductor, the diameter or size of the first and second damping elements, and/or even the profile (cross-section) of the first and second damping elements.

According to an embodiment, the first axis and the second axis may be arranged within a plane comprising the main axis, which is advantageous in that a more compact device may be obtained. In a particular embodiment, the main axis, the first axis and the second axis may be arranged parallel to each other or, in other words, the main axis, the first axis and the second axis may be arranged without intersecting each other. Further, it will be appreciated that the first and second damping elements may advantageously be arranged symmetrical to each other relative to the conductor. These specific arrangements are particularly advantageous in applications wherein there is space limitation in one dimension, such as for instance in interior applications. The main axis, the first and the second axis may for instance be arranged within a common horizontal plane, i.e. the device extend laterally (the conductor is laterally spaced away from the first and second damping elements), which is suitable for applications with space limitation in a vertical direction but still providing a relatively large freedom for designing the device in a lateral direction.

According to an embodiment, the conductor or electrically conducting member may be one of a bus bar, a cord, a rod or a tube (pipe) of electrically conducting material. Further, the conductor may be made of any electrically conducting material having good conducting properties such as Aluminum, brass or Copper.

According to an embodiment, each one of the first and second damping elements may be one of a cord, a rod or a tube (pipe) of electrically conducting material, and/or wherein a cross-section of the first and second damping elements may be circular, oval or rectangular. It will be appreciated that for high voltage applications, the cross-section of the first and second damping elements may advantageously be U-shaped for avoiding sharp edges at which the electrical field may then be more pronounced. Still, rectangular cross-sections may be envisaged for low voltage applications.

Further, the first and second damping elements may be made of stainless steel or Aluminum, and preferably of a material with higher resistivity than the material of the conductor. If the conductor is made of Copper or Aluminum, then the first and second damping elements are preferably made of stainless steel or a material of higher resistivity than Copper or Aluminum.

According to an embodiment, a diameter, thickness or cross-sectional size of the conductor is less than (or approximately equal to) a corresponding diameter, thickness or cross-sectional size of the first and/or second damping elements, which is advantageous in that it does not require a larger distance from either one of the first and second damping elements of the device (forming the damping unit of the device) to any surrounding surface, such as a grounded wall or grounded ceiling for example, as compared to a device without any damping elements, i.e. a device comprising only a conductor. The conditions on the electrode forms/sizes (i.e. the sizes of the first and second damping elements relative to that of the conductor) are advantageous for insulation purposes. With the present embodiment, a device comprising a damping unit (with first and second damping elements) does not require a larger air clearance (i.e. a larger distance to any surrounding surface) than a device comprising only a conductor for the same electrical withstand capability. For indoor switchyards for example, the vertical dimension is often more critical than the horizontal one. In such applications, with the present embodiment, a larger air clearance is not required in the vertical dimension.

Referring again for illustrative purposes to the example in which the main axis, the first axis and the second axis are comprised within a common horizontal plane, a cross-sectional size of the conductor along a vertical direction (which may be a thickness or diameter, depending on the shape of the conductor) is less than a corresponding cross-sectional size of the first and/or the second damping elements along the same vertical direction. Still, the device is advantageous in that a cross-sectional size of the first and second damping elements may only be slightly larger than a corresponding cross-sectional size of the conductor and thus almost approximately equivalent. A rather compact device in at least one direction (a vertical direction in the present example) may then be obtained.

According to an embodiment, the first damping path may include a first branch electrically connecting a first end of the first damping element to the first position and a second branch electrically connecting a second end of the first damping element to the second position. Similarly, the second damping path may include a third branch electrically connecting a first end of the second damping element to the first position and a fourth branch electrically connecting a second end of the second damping element to the second position. It will be appreciated that the branches may advantageously contribute to the damping of the high frequency currents.

According to an embodiment, each of the branches extends from the first or second position along the conductor to its respective damping element. The branches may be separate plates. Alternatively, each of the first damping path and the second damping path may be a single U-shaped mechanical piece.

According to an embodiment, the branches may be zigzag shaped. For example, the branches may be made of folded plates. These embodiments are advantageous in that a longer path is provided for attenuation of the high frequency currents, i.e. a higher resistance is provided in the branches (or plates), which in its turn further increase the overall attenuation gain.

According to an embodiment, the branches may be made of stainless steel and/or the branches may be made of a material having a resistivity higher than a resistivity of a material of the conductor.

Further, it will be appreciated that the device may further comprise a mechanical support including at least one bar extending from the conductor to the first and second damping elements, which increases the mechanical stability of the device. It will be appreciated that the bar may be positioned along the conductor between the first position and the second position, i.e. between the branches connecting the first damping element to the conductor or between the branches connecting the second damping element to the conductor. A plurality of bars may be used to further enhance mechanical stability. However, it is preferable on an electrical point of view to limit the number of supporting bars since, for instance, two supporting bars extending from one of the first and second damping elements to the conductor would create a parallel resistance, which would decrease the attenuation gain. If two or more supporting bars are required for mechanical stability, then it is preferable to arrange the supporting bars as close to each other as possible. If the material used for the supporting bars is electrically conductive, isolation material may be used at the connection between the supporting bars and the first and second damping elements.

According to an embodiment, the first damping path and the second damping path may define a first damping section between the first position and the second position. The device may then further comprise a second damping section including a first damping path and a second damping path such as defined in any one of the preceding embodiments. The second damping section may be arranged consecutively to the first damping section between a third position and a fourth position along the conductor.

Providing a plurality of damping sections along the conductor is advantageous since the overall resistance of the damping structure (including all damping sections), i.e. the overall attenuation gain, may be adjusted by varying the length of the damping sections and the number of sections.

The present invention is applicable for busses connecting a semiconductor switching element in an installation for high voltage power equipment such as valve halls for HVDC or plants for high power static devices for control of the AC network voltages or AC network power flow. The invention may also be applicable for busses used for connection of a power electronic equipment with the main part of a power station. Other applications such as damping/attenuation of switching transients may also be envisaged.

It will be appreciated that other embodiments using all possible combinations of features recited in the above described embodiments may be envisaged.

BRIEF DESCRIPTION OF THE DRAWINGS

Exemplifying embodiments will now be described in more detail, with reference to the following appended drawings.

As illustrated in the figures, the sizes of the elements, layers and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
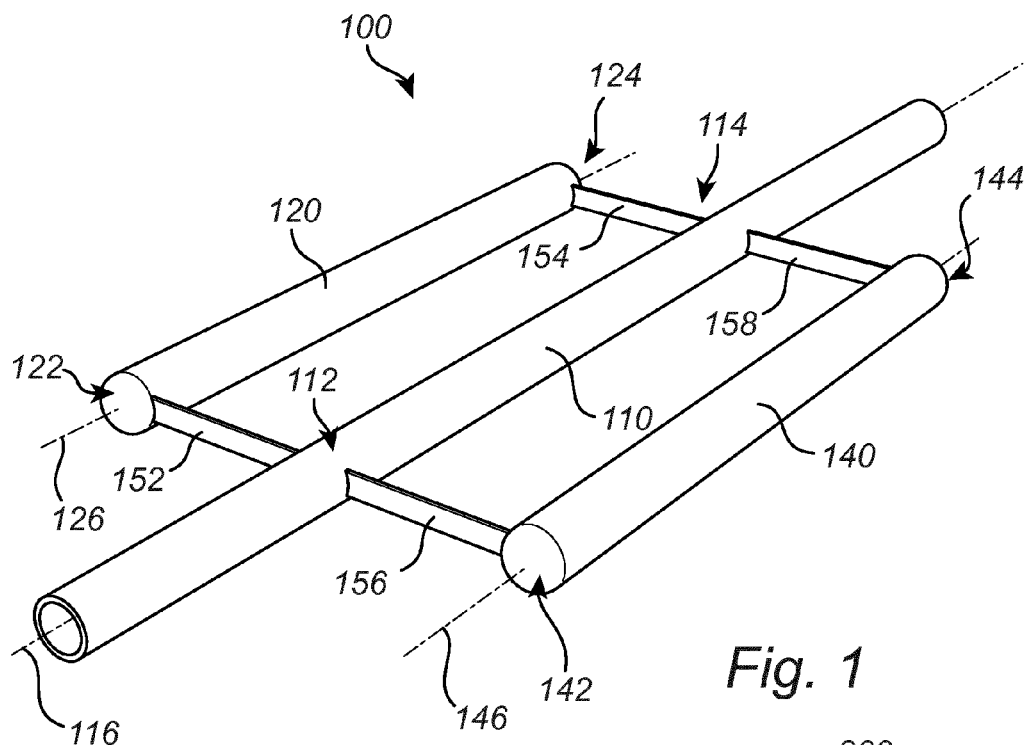
FIG. 1 shows a schematic view of a device in accordance with an embodiment.

With reference to FIG. 1, a device according to an embodiment is described.

FIG. 1 shows a device including a conductor or electrically conducting member (central conductor) 110, a first damping path including a first damping element (120) and a second damping path including a second damping element (140).

The first damping element 120 and the second damping element 140 are arranged on opposite sides of the conductor 110, spaced apart from the conductor 110 and electrically connected in parallel with the conductor 110 between a first position 112 and a second position 114 along the conductor.

The conductor 110 extends along a main axis 116, the first damping element 120 extends along a first axis 126 and the second damping element 140 extends along a second axis 146. The main axis 116, the first axis 126 and the second axis 146 are different and separate from each other.

In the example shown in FIG. 1, the device includes also four branches 152, 154, 156, 158. The four damping branches 152, 154, 156, 158 electrically connect the first and second damping elements 120, 140 in parallel with the conductor 110 between a first position (or first point) 112 and a second position (or second point) 114 of the conductor 110. Two of the damping branches 152, 154 and the first damping element 120 form the first damping path while two of the damping branches 156, 158 and the second damping element 140 form the second damping path. The damping branches 152, 154, 156, 158 space apart the first and second damping elements 120, 140 from the conductor 110 such that an air gap is provided between the first and second damping elements 120, 140 from the conductor 110.

Further, from the first position 112 to the second position 114, a resistance of the conductor 110 is lower than a resistance of either one of the first and second damping paths formed by, on the one hand, the branches 152, 154 and the first damping element 120 and, on the other hand, the branches 156, 158 and the second damping element 140.

In FIG. 1, the first axis 126 and the second axis 146 are arranged within a plane comprising the main axis 116. In other words, the main axis 116, the first axis 126 and the second axis 146 are arranged within a common plane. Further, in the specific embodiment shown in FIG. 1, the main axis 116, the first axis 126 and the second axis 146 are arranged parallel to each other. Still referring to FIG. 1, the branches 152, 154, 156, 158 extend perpendicularly to the conductor 110 and the first and second damping elements 120, 140.

The operation principle of the device 100 is based on the skin effect wherein high frequency components of the currents flow at the outer surface of the conductor 110 and damping is provided because these high frequency components are rerouted from the conductor 110 into the two electrical damping paths formed by the branches 152, 154, 156, 158 and the damping elements 120, 140. As the resistance in these two electrical damping paths is larger than the resistance of the conductor 110 between the first connecting point 112 and the second connecting point 114, attenuation of the high frequency currents is provided. Generally, the percentage of current being rerouted from the conductor 110 to the more highly resistive part of the device 100, i.e. the two electrical damping paths made of the branches 152, 154, 156, 158 and the first and second damping elements 120, 140, depends on the relationship between the resistance and the driving voltage due to a high frequency magnetic flux in within a first window formed by the conductor 110, the first damping element 120 and the branches 152, 154 and a second window formed by the conductor 110, the second damping element 140 and the branches 156, 158.

Still referring to FIG. 1, a first plate 152 is arranged to electrically connect a first end 122 of the first damping element 120 to the first point 112, a second plate 154 is arranged to electrically connect a second end 124 of the first damping element 120 to the second point 114, a third plate 158 is arranged to electrically connect a first end 142 of the second damping element 140 to the first point 112 and a fourth plate 158 is arranged to electrically connect a second end 144 of the second damping element 158 to the second point 114. It will be appreciated that some tolerance may be accepted as to the exact location or position of the connection of each of the branches along the conductor. Thus, it may also be defined that, for example, the first plate 152 and the fourth plate are arranged to connect the conductor approximately at the first point. Similarly, the second plate 154 and the third plate are arranged to connect the conductor approximately at the second point. The same would apply for the connection at the ends of the damping elements.

As a result, the damping branches 152, 154, 156, 158 space apart each of the first and second damping elements 120, 140 from the conductor 110. The resulting air gap between the conductor 110 and each of the first and second damping paths defines closed loops around the magnetic field which forces the high frequency currents to flow in the first and second damping elements 120, 140, thereby increasing the attenuation of the high frequency currents in the conductor 110.

It will be appreciated that, with the symmetry of the embodiment shown in FIG. 1, using the same dimensions on either side of the conductor (e.g. the same spacing between the first damping element and the conductor as between the second damping element and the conductor, the same sizes of the damping elements . . . ), then the resulting resistances of the two damping paths would be approximately the same.

According to a more specific example, FIG. 1 shows a central conductor 110 for conducting electricity. The central conductor 110 may also be an electrically conducting rod, tube or cylinder. It will be appreciated that bus bars often are flat strips or hollow tubes. The skin effect makes 50-60 Hz AC bus bars more than about 8 mm thickness inefficient, so hollow or flat shapes are prevalent in higher current applications. The bus bar 110 may be made of a electrically conducting material such as Aluminum, brass or Copper. Two profiles, for example rods or tubes 120, 140, of for example stainless steel are added on each side of the bus bar 110 for forcing the high frequency components of the currents flowing in the bus bar 110 into the profiles of stainless steel which, together with the plates 152, 154, 156, 158 connecting the profiles of stainless steel to the central conductor 110 at two specific points 112, 114, have a higher resistance than the central conductor between these two specific points. The additional stainless steel tubes introduce additional losses and thus a damping of the high frequency components of the currents flowing in the central conductor 110.

Figure 2:
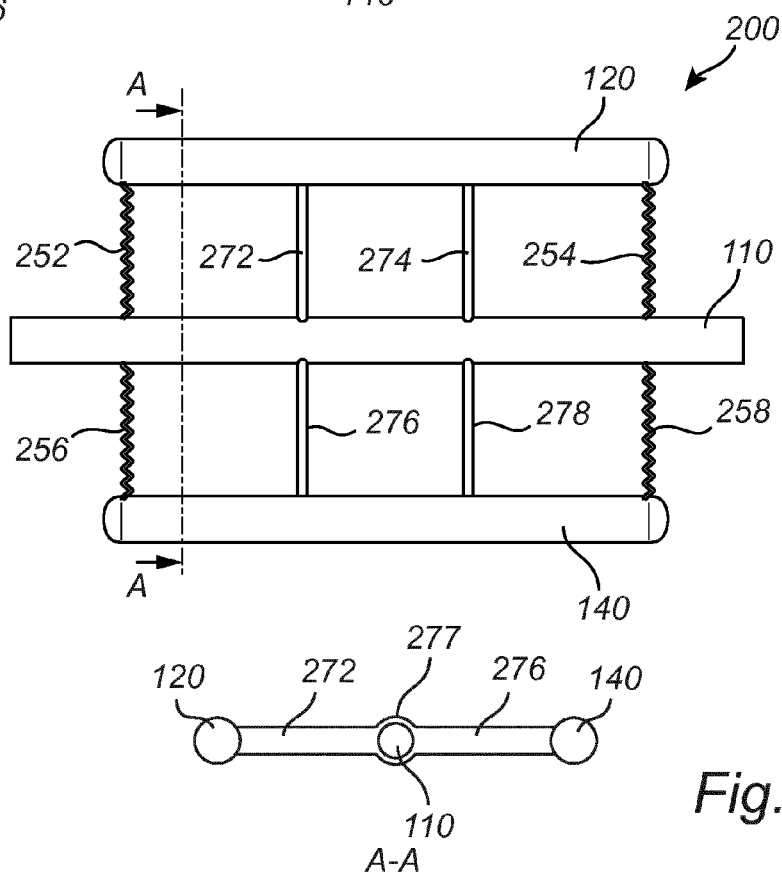
FIG. 2 shows a schematic view of a device in accordance with another embodiment.

With reference to FIG. 2, a device 200 according to another embodiment is described.

FIG. 2 shows a device 200 which is equivalent to the device 100 described with reference to FIG. 1 except that the branches are not straight (or flat) plates but folded plates 252, 254, 256, 258 and except that the device also includes a mechanical support including supporting bars 272, 274, 276, 278.

In FIG. 2, each of the branches 252, 254, 256, 258 is zigzag shaped. Such branches may be realized by folded plates, which increase the resistance of the branches as the effective distance for the current to flow from the conductor to the first and second damping elements becomes longer.

Further, the device 200 may be equipped with supporting bars (or rods) extending from the conductor 110 to the first and second damping elements 120, 140 for improving the mechanical stability of the device 200. More specifically, FIG. 2 shows a mechanical support including four bars wherein two bars 272, 274 extend from the conductor 110 to the first damping element 120 and two other bars 276, 278 extend from the conductor 110 to the second damping element 140. In FIG. 2, a first supporting bar 272 and a second supporting bar 276 extend from a common point along the conductor 110 to the first and second damping elements 120, 140. Similarly, another set of supporting bars 274, 278 extend from another common point along the conductor 110 to the first and second damping elements 120, 140. As an alternative to the embodiment shown in the main drawing of FIG. 2, it will be appreciated that a single mechanical piece may include a ring 277 in which the bus bar 110 may be inserted (i.e. a ring having a diameter or cross-sectional size larger than a diameter or cross-sectional size of the conductor 110) and from which two supporting bars extend either to the first damping element 110 or the second damping element 140, as illustrated in the cross-sectional view along section AA in FIG. 2 (it will be understood that the cross-sectional view shows an alternative to the embodiment of the main drawing of FIG. 2 wherein supporting bars 272 and 276 are not joined).

Depending on the material of the mechanical support, some isolation material may be added at any intersection between a supporting bar 272, 274, 276, 278 of the mechanical support and the conductor 110, the first damping element 120 or the second damping element 140.

Figure 3:
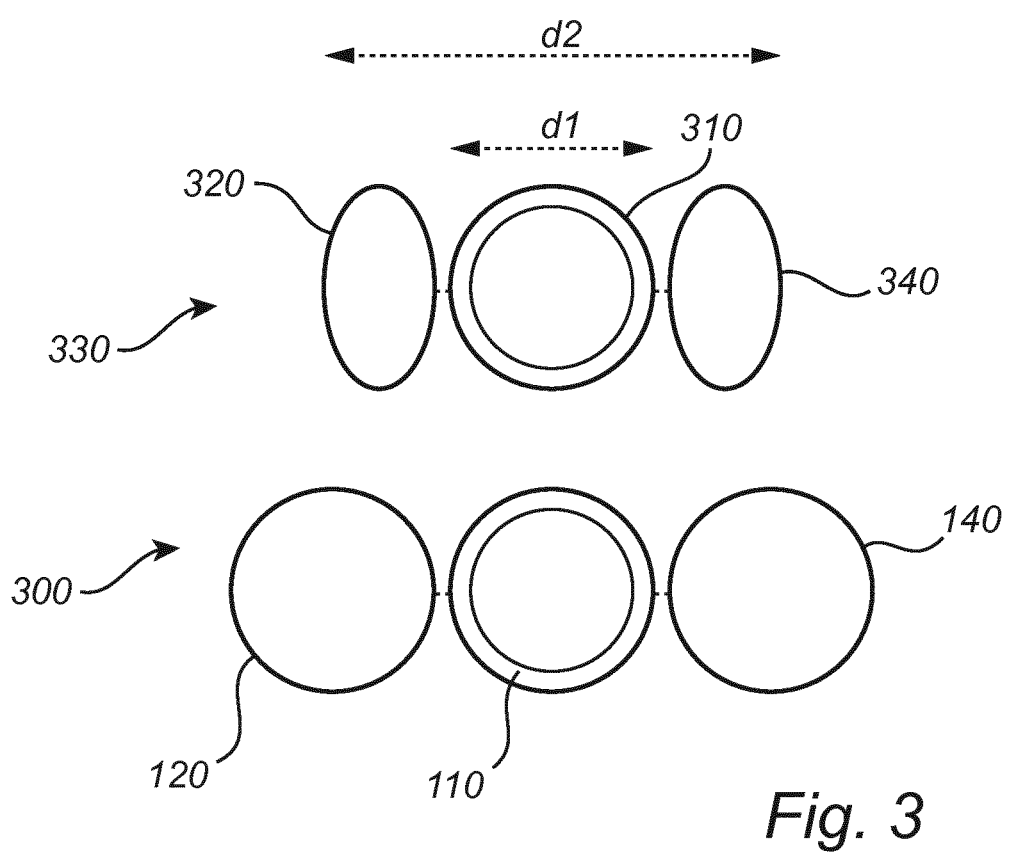
FIG. 3 shows cross-sectional views of devices in accordance with some another embodiments.

FIG. 3 illustrates cross-sectional views of devices according to other embodiments. More specifically, FIG. 3 shows a first device 300 in which the bus bar 110 has a circular cross-section (such as an hollow Aluminum tube) and the damping elements 120, 140 also have a circular cross-section (such as hollow stainless steels tubes).

FIG. 3 shows also a second device 330 in which the bus bar 310 has a circular cross-section such as an hollow Aluminum tube and the damping elements 320, 340 have an oval cross-section.

The attenuation gain of the devices may be controlled by adjusting the diameter of the tubes 110, 120, 140, such as illustrated by d1 denoting the diameter of the conductor 110, the spacing between the tubes 110, 120, 140, the thickness of the tubes 110, 120, 140 and/or also by adjusting the profiles (shape of the cross-sections) of the tubes 110, 120, 140. Referring to FIG. 3, the distance including the diameter (or lateral size) of the first damping element 320, the spacing between the first damping element 320 and the conductor 310, the diameter (or lateral size) of the conductor 310, the spacing between the conductor 310 and the second damping element 340 and the diameter (or lateral size) of the second damping element 340 may be denoted d2. The attenuation gain may for instance be controlled by varying the ratio between d2 and d1.

Figure 4:
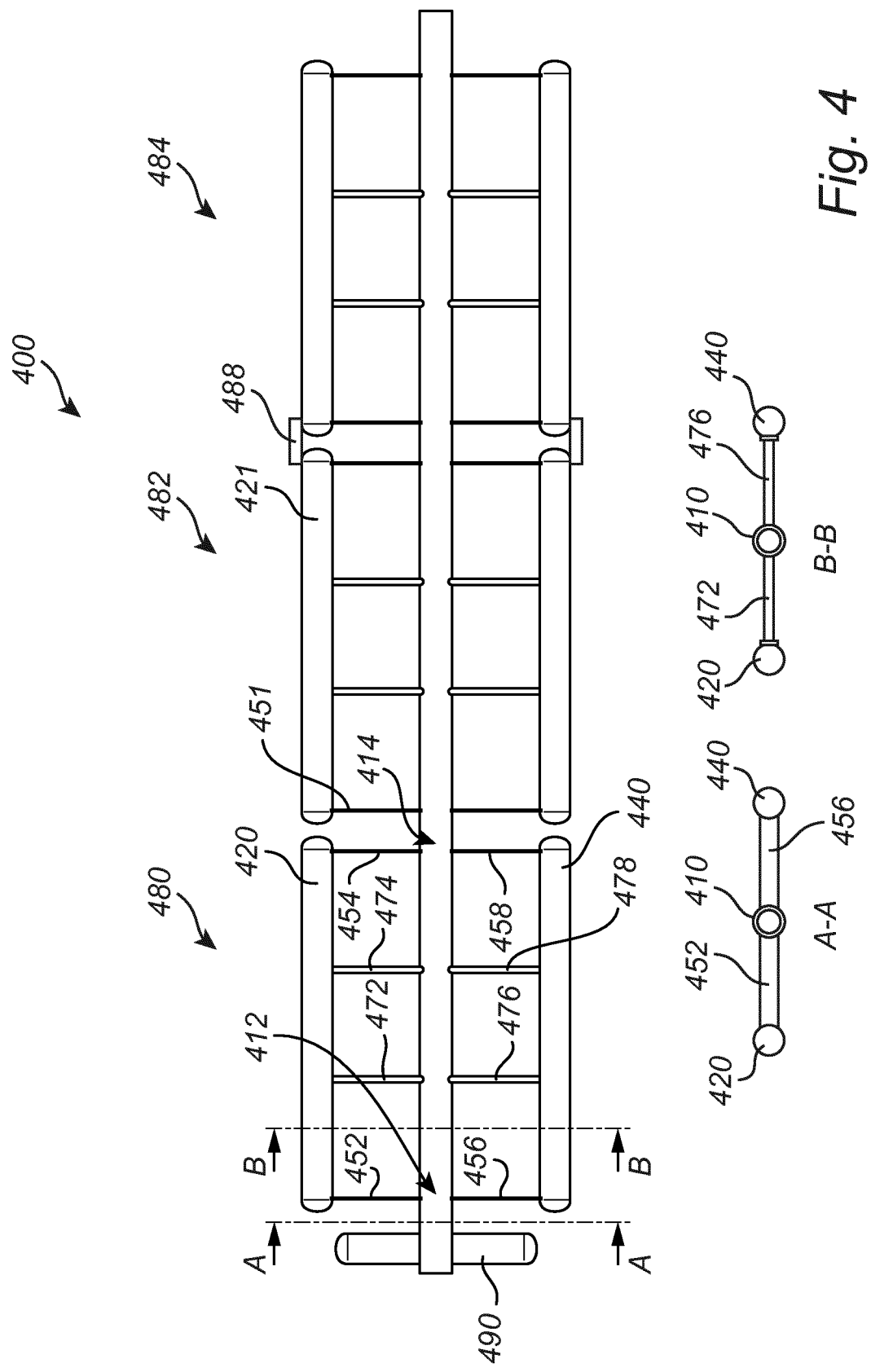
FIG. 4 shows a schematic view of a device in accordance with an embodiment.

Referring to FIG. 4, a device 400 according to another embodiment is described.

FIG. 4 shows a device 400 including a first damping section 480, a second damping section 482 and a third damping section 484.

Each of the first, second and third damping sections 480, 482, 484 include first and second damping elements and branches such as in any one of the above described embodiments.

FIG. 4 shows also cross-sectional views of the device 400 along lines A-A and B-B.

Assuming that the length of a damping section (i.e. the distance between a first point 412 and a second point 414 of the conductor 410) is one meter and that the distance between the conductor 410 and each one of the first and damping elements 420, 440 is also one meter, the attenuation gain in the damping section may be calculated and the result is shown in Table 1 below. The attenuation gain is defined by the resistance in the damping section divided by the resistance of the central conductor, for the same length, considering the skin effect. Other dimensions assumed in the example relating to Table 1 are a diameter for the Aluminum conducting tube 410 and for the stainless steel tubes of 150 mm and that the branches 452, 454, 456, 458 are 0.5 mm thick and about 150 mm high. The material properties selected for the branches are typical for materials used for manufacturing resistors. For example, a resistor material has a resistivity which is approximately 140 times the resistivity of Copper. Stainless steel has a resistivity of approximately 40 times the resistivity of Copper.

Table 1 shows the attenuation gain for two different configurations, namely a first configuration called "plate connection 1 m/m" in which the branches (or plates) are straight (flat), i.e. the length of the plates and the effective distance made by the current from the conductor 410 to either one of the first and second damping elements 420, 440 is one meter, and a second configuration called "plate connection 2 m/m" in which the branches (or plates) are folded or zigzag shapes such that the effective distance made by the current from the conductor 410 to either one of the first and second damping elements 420, 440 is two meters. The first configuration corresponds to the embodiment shown in FIG. 1 or 4 while the second configuration corresponds to the embodiment shown in FIG. 2.

In table 1, R1 refers to the resistance of the conductor between the first point 412 and the second point 414, i.e. R1 is the resistance of the central conductor only. It will be appreciated that the resistance R1 increases as a function of frequency because of the skin effect. As illustrated by table 1, with devices according to embodiments of the invention, the attenuation gain is significantly increased for high frequency currents with an attenuation gain reaching up to 1880 for the configuration with folded plates at a frequency of 100 MHz in this particular example.

TABLE 1

Attenuation gain at different frequencies for two different configurations

| Frequency | R1 [mΩ/m] | Plate connection 1 m/m | | Plate connection 2 m/m | |
|---|---|---|---|---|---|
| | | R_tot [mΩ/m] | Gain | R_tot [mΩ/m] | Gain |
| 50 Hz | 0.0061 | 0.0067 | 1.10 | 0.0064 | 1.05 |
| 1 kHz | 0.022 | 0.15 | 6.5 | 0.084 | 3.8 |
| 10 kHz | 0.070 | 3.75 | 54 | 1.99 | 29 |
| 100 kHz | 0.22 | 77 | 350 | 53.9 | 245 |
| 1 MHz | 0.7 | 561 | 810 | 780 | 1130 |
| 10 MHz | 2.2 | 2000 | 930 | 3900 | 1770 |
| 100 MHz | 6.9 | 6540 | 944 | 13000 | 1880 |

The effective resistance in the plates 452, 454, 456, 458 of stainless steel increases also because of the skin effect, which is advantageous. However, if a damping structure (or damping arrangement) including the plates 452, 454, 456, 458 and the first and second damping elements 420, 440 is too long (along the first and second axis), the resulting overall resistance would be too high and the attenuation gain would be limited. Thus, the damping structure is preferably sectioned to include a plurality of damping sections 480, 482, 484, such as depicted in FIG. 4.

Generally, it will be appreciated that the diameter of the stainless steel tubes (i.e. the first and second damping elements) 420, 440 is preferably not smaller than the diameter of the central conductor since, otherwise, the stainless steel tubes would have a too high self inductance, i.e. the driving magnetic flux will be lower and a smaller percentage of the high frequency current will be forced out into the damping elements 420 and 440.

Regarding the branches or plates 452, 454, 456, 458, it will be appreciated that their height is in the range of the diameters of the conductor 410 or the first and second damping elements 420, 440. This provides also for an improved compactness of the resulting device. Further, the thickness of the plates 452, 454, 456, 458, i.e. the dimension in a direction along the length of the conductor 410, may not be too small as it would otherwise provide a too high inductance. However, the plates may preferably not extend outside a region screened by the first and second damping elements 420, 440.

Still referring to FIG. 4, the first damping section 480, the second damping section 482 and the third damping section 484 are arranged consecutively along the conductor 410. It will be appreciated that with these sections arranged in series a certain voltage may be induced between two consecutive damping elements of two adjacent sections, for instance between the first damping element 420 of the first damping section 480 and the first damping element 421 of the second damping section 482, because of the voltage drop in the branch 454 connecting a second end of the first damping element 420 of the first damping section 480 to the conductor 410 and the branch 451 connecting a first end of the first damping element 451 of the second damping section 482 to the conductor 410. Such induced voltage is higher for the case of fast transients than for continuous bias. For limiting any negative effect of such induced voltage during e.g. switch (turn on/turn off) of an electrical apparatus to which the conductor 410 is connected, an isolator or isolation means 488 may be provided at the junction between two damping elements of two adjacent sections, such as illustrated in FIG. 4.

The present invention is applicable for HVDC installations, wherein an HVDC transmission includes from one power system to another: an AC side part including a switchyard and a transformer, in most cases with a driving voltage above 100 kV, converter valves which are the active switching elements for converting the AC voltage/current to DC voltage/current, a DC line (cable or overhead line), converter valves at the other end and an AC side part at the other end with connection to the receiving AC power system. The valves are located indoor in a valve hall. Embodiments of the present invention are therefore advantageous in that space is often a limited factor in such indoor applications.

For example, the device 400 may be used for connection of busses in a valve hall housing the valves, which, as mentioned above, are the active switching elements in high voltage high power electronics, e.g. an HVDC converter for converting AC power to DC power or vice versa. The device 400 is particularly advantageous for such interior applications as it is relatively compact in at least one direction (namely the direction substantially perpendicular to the main axis of the conductor) and, at the same time, provides a large degree of freedom in design, i.e. a large degree of freedom in adjusting the attenuation gain of the device. In such applications, the conductor may be used to connect two valves.

Without losing generality in the teaching of the invention, considering an example with an Aluminum conductor (or bus bar) 410 and a damping structure of stainless steel with plates 452, 454, 456 and 458 and peripheral tubes 420, 440 such as described in the above embodiments, it will be appreciated that the stainless steel tubes 420, 440 may preferably have at least the same diameter as the Aluminum conductor 410. The diameter of the stainless steel tubes 420, 440 may even be slightly larger than the Aluminum conductor 410 to limit the inductance. However, a larger increase would only have a limited effect as the inductance varies as a logarithmical function of the diameter.

It will be also be appreciated that the amount of the magnetic flux between the Aluminum conductor 410 and the stainless steel tubes 420, 440 also varies as a logarithmical function of the distance between the Aluminum conductor 410 and the stainless steel tubes 420, 440. Further, the resistance in the stainless steel plates 452, 454, 456, 458 is linearly dependent on the effective length of the plates. Thus, although the lateral size of the device may for example have to be adjusted for a specific application (e.g. connection to valve cells in the above example) in which the device is used, the distance between the Aluminum conductor 410 and the stainless steel tubes 420, 440 should be sufficiently large.

It will be appreciated that the number of sections may also be varied depending on a desired attenuation level. For example, if the attenuation gain of the damping structure is lowered because of the introduction of a mechanical support, the number of damping sections along the Aluminum conductor 410 may be increased.

Further, the device may also be equipped with a Corona screen 490 at an end of the damping structure along the conductor 410, i.e. at the first or last damping section of the damping structure. Referring to FIG. 4, the Corona screen 490 may extend across the conductor 410 in a direction from the first damping element 420 to the second damping element 440.

Figure 5:
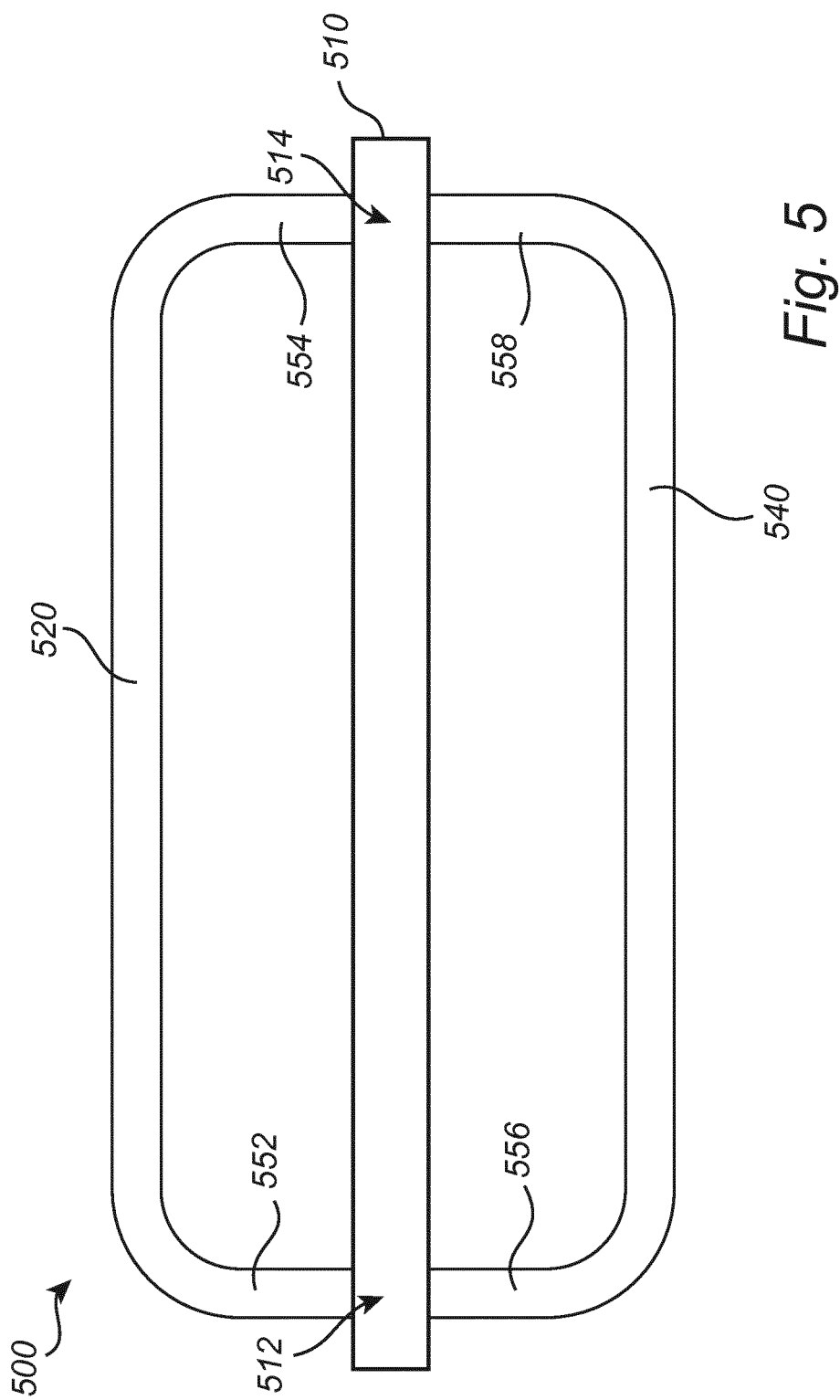
FIG. 5 shows a schematic view according to another embodiment.

Referring to FIG. 5, another embodiment is described. FIG. 5 shows a device 500 which may be equivalent to any one of the devices 100, 200, 300, 330 and 400 described above with reference to FIGS. 1-4 except that each of the first damping path and the second damping path is made of a single U-shaped mechanical piece.

In this embodiment, two branches form a single mechanical piece together with a damping element. More specifically, a first U-shaped mechanical piece includes two branches or legs 552, 554 connecting a first main damping element 520 with the central conductor 510 between a first position 512 and a second position 514 along the conductor 510. A second U-shaped mechanical piece includes two other branches or legs 556, 558 connecting a second main damping element 520 with the central conductor 510 between the first position 512 and the second position 514. It will be appreciated that the present embodiment may be combined with any features of the embodiments described above with reference to FIGS. 1-4.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A device for damping of high frequency currents comprising:
   a conductor extending along a main axis;
   a first damping path including a first damping element extending along a first axis; and
   a second damping path including a second damping element extending along a second axis,
   wherein the first and second damping elements are arranged on opposite sides of the conductor, and the main axis, the first axis and the second axis are different and separate from each other,
   wherein the first damping element and the second damping element are spaced apart from the conductor and electrically connected in parallel with the conductor between a first position and a second position along the conductor, and
   wherein, from the first position to the second position, a resistance of the conductor is lower than a resistance of either one of said first and second damping paths.

2. The device of claim 1, wherein the first axis and the second axis are arranged within a plane comprising the main axis.

3. The device of claim 2, wherein the main axis, the first axis and the second axis are arranged parallel to each other.

4. The device of claim 2, wherein the conductor is one of a bus bar, a cord, a rod or a tube made of electrically conducting material.

5. The device of claim 2, wherein the conductor is made of Aluminum, brass or Copper.

6. The device of claim 1, wherein the main axis, the first axis and the second axis are arranged parallel to each other.

7. The device of claim 6, wherein the conductor is one of a bus bar, a cord, a rod or a tube made of electrically conducting material.

8. The device of claim 6, wherein the conductor is made of Aluminum, brass or Copper.

9. The device of claim 1, wherein the conductor is one of a bus bar, a cord, a rod or a tube made of electrically conducting material.

10. The device of claim 1, wherein the conductor is made of Aluminum, brass or Copper.

11. The device of claim 1, wherein each one of the first and second damping elements is one of a cord, a rod or a tube of electrically conducting material, and/or wherein a cross-section of the first and second damping elements is circular, oval or rectangular.

12. The device of claim 1, wherein the first and second damping elements are made of stainless steel or Aluminum.

13. The device of claim 1, wherein a diameter, thickness or cross-sectional size of the conductor is less than a corresponding diameter, thickness or cross-sectional size of the first and/or second damping element.

14. The device of claim 1, wherein the first damping path includes a first branch electrically connecting a first end of the first damping element to the first position and a second branch electrically connecting a second end of the first damping element to the second position, and wherein the second damping path includes a third branch electrically connecting a first end of the second damping element to the first position and a fourth branch electrically connecting a second end of the second damping element to the second position.

15. The device of claim 14, wherein each of the branches extends from the first or second position along the conductor to a respective damping element.

16. The device of claim 14, wherein the branches are separate plates.

17. The device of claim 14, wherein the branches are zigzag shaped.

18. The device of claim 14, wherein said branches include stainless steel and/or wherein said branches are made of a material having a resistivity higher than a resistivity of a material of the conductor.

19. The device of claim 1, wherein each of the first damping path and the second damping path is a single U-shaped mechanical piece.

20. The device of claim 1, wherein the first damping path and the second damping path define a first damping section between the first position and the second position, the device further comprising a second damping section including a first damping path and a second damping path, said second damping section being arranged consecutively to the first damping section between a third position and a fourth position along the conductor.

* * * * *